(12) United States Patent
Ould-Ahmed-Vall et al.

(10) Patent No.: US 10,387,148 B2
(45) Date of Patent: *Aug. 20, 2019

(54) APPARATUS AND METHOD TO REVERSE AND PERMUTE BITS IN A MASK REGISTER

(71) Applicant: Intel Corporation, Santa Clara, CA (US)

(72) Inventors: Elmoustapha Ould-Ahmed-Vall, Chandler, AZ (US); Robert Valentine, Kiryat Tivon (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/785,016

(22) Filed: Oct. 16, 2017

(65) Prior Publication Data

US 2018/0039497 A1 Feb. 8, 2018

Related U.S. Application Data

(63) Continuation of application No. 15/487,080, filed on Apr. 13, 2017, now Pat. No. 10,209,988, which is a (Continued)

(51) Int. Cl.
*G06F 9/30* (2018.01)

(52) U.S. Cl.
CPC ...... *G06F 9/30018* (2013.01); *G06F 9/30032* (2013.01); *G06F 9/30036* (2013.01); *G06F 9/30098* (2013.01)

(58) Field of Classification Search
None
See application file for complete search history.

(56) References Cited

U.S. PATENT DOCUMENTS 5,511,210 A 4/1996 Nishikawa et al.
5,553,309 A * 9/1996 Asai .................. G06F 9/30029
710/34

(Continued)

FOREIGN PATENT DOCUMENTS

CN 1503936 A 6/2004
CN 101105979 A 1/2008
(Continued)

OTHER PUBLICATIONS

Non-Final Office Action from U.S. Appl. No. 15/487,080, dated Dec. 15, 2017, 16 pages.
(Continued)

*Primary Examiner* — Steven G Snyder
(74) *Attorney, Agent, or Firm* — Nicholson De Vos Webster & Elliott LLP

(57) ABSTRACT

An apparatus and method are described for performing a bit reversal and permutation on mask values. For example, a processor is described to execute an instruction to perform the operations of: reading a plurality of mask bits stored in a source mask register, the mask bits associated with vector data elements of a vector register; and performing a bit reversal operation to copy each mask bit from a source mask register to a destination mask register, wherein the bit reversal operation causes bits from the source mask register to be reversed within the destination mask register resulting in a symmetric, mirror image of the original bit arrangement.

18 Claims, 12 Drawing Sheets

Related U.S. Application Data continuation of application No. 13/929,563, filed on Jun. 27, 2013, now Pat. No. 9,645,820.

(56) References Cited

U.S. PATENT DOCUMENTS

| | | | |
|---|---|---|---|
| 5,832,288 | A | 11/1998 | Wong |
| 6,622,242 | B1 | 9/2003 | Steele, Jr. |
| 7,017,028 | B2 | 3/2006 | Ben-David et al. |
| 7,062,637 | B2 | 6/2006 | Ganapathy et al. |
| 7,174,014 | B2 | 2/2007 | Lee et al. |
| 7,610,466 | B2 | 10/2009 | Moyer |
| 7,676,647 | B2 | 3/2010 | Codrescu et al. |
| 8,433,747 | B2 | 4/2013 | Qiu et al. |
| 9,645,820 | B2 | 5/2017 | Ould-Ahmed-Vall et al. |
| 10,157,061 | B2 * | 12/2018 | Corbal ............... G06F 9/30029 |
| 10,203,954 | B2 * | 2/2019 | Ould-Ahmed-Vall ...................... G06F 9/30018 |
| 10,209,988 | B2 * | 2/2019 | Ould-Ahmed-Vall ...................... G06F 9/30036 |
| 2002/0078011 | A1 | 6/2002 | Lee et al. |
| 2005/0289329 | A1 | 12/2005 | Dwyer et al. |
| 2007/0118720 | A1 * | 5/2007 | Espasa ............... G06F 9/30018 712/5 |
| 2007/0143579 | A1 | 6/2007 | Shih et al. |
| 2009/0172348 | A1 * | 7/2009 | Cavin ............... G06F 9/30036 712/4 |
| 2009/0172365 | A1 * | 7/2009 | Orenstien ........... G06F 9/30032 712/225 |
| 2012/0166511 | A1 | 6/2012 | Hiremath et al. |
| 2013/0151822 | A1 * | 6/2013 | Eichenberger ...... G06F 9/30018 712/234 |
| 2013/0305020 | A1 * | 11/2013 | Valentine ............. G06F 9/3001 712/208 |
| 2014/0223139 | A1 * | 8/2014 | Lee ..................... G06F 9/30021 712/5 |
| 2014/0281372 | A1 | 9/2014 | Ingle et al. |
| 2014/0297991 | A1 * | 10/2014 | Corbal ............... G06F 9/30029 712/3 |
| 2017/0220350 | A1 * | 8/2017 | Ould-Ahmed-Vall ...................... G06F 9/30036 |

FOREIGN PATENT DOCUMENTS

| | | |
|---|---|---|
| CN | 101201736 A | 6/2008 |
| EP | 0407177 A2 | 1/1991 |
| EP | 1267258 A2 | 12/2002 |
| KR | 19980032137 A | 7/1998 |
| KR | 20100114050 A | 10/2010 |
| KR | 20120054027 A | 5/2012 |
| RU | 2376709 C2 | 12/2009 |
| RU | 2439662 C2 | 1/2012 |
| TW | 200606717 A | 2/2006 |
| TW | 200638264 A | 11/2006 |
| WO | 9844409 A1 | 10/1998 |

OTHER PUBLICATIONS

Notice of Preliminary Rejection from foreign counterpart Korean Patent Application No. 10-2017-7005908, dated Nov. 10, 2017, 5 pages.
Final Office Action from U.S. Appl. No. 15/487,080, dated Apr. 18, 2018, 12 pages.
First Office Action and Search Report from foreign counterpart Chinese Patent Application No. CN201480030625.0, dated Feb. 23, 2018, 19 pages.
Communication pursuant to Article 94(3) EPC for Application No. 14817656.3, dated Jul. 17, 2018, 4 pages.
Notice of Allowance from foreign counterpart Taiwan Patent Application No. 105143906, dated Jul. 18, 2018, 4 pages.
Notice of Preliminary Rejection from foreign counterpart Korean Patent Application No. 10-2017-7005908, dated Jun. 29, 2018, 14 pages.
Extended European Search Report for Application No. 14817656.3, dated May 24, 2017, 9 pages.
Final Office Action from U.S. Appl. No. 13/929,563, dated Aug. 18, 2016, 12 pages.
Final Office Action from U.S. Appl. No. 13/929,563, dated Mar. 29, 2016, 12 pages.
Final Office Action from U.S. Appl. No. 15/487,080, dated Aug. 28, 2017, 10 pages.
International Preliminary Report on Patentability for International Application No. PCT/US2014/042789, dated Dec. 29, 2015, 7 pages.
International Search Report and Written opinion for International Application No. PCT/US2014/042789, dated Oct. 30, 2014, 9 pages.
Non-Final Office Action from U.S. Appl. No. 13/929,563, dated Nov. 30, 2015, 11 pages.
Non-final Office Action from U.S. Appl. No. 15/487,080, dated May 1, 2017, 4 pages.
Notice of Allowance from U.S. Appl. No. 13/929,563, dated Apr. 13, 2017, 6 pages.
Notice of Allowance from U.S. Appl. No. 13/929,563, dated Jan. 11, 2017, 10 pages.
Office Action and Search Report from foreign counterpart Russian Patent Application No. 2015151187, dated Mar. 29, 2017, 11 pages. (Translation available only for Office Action).
Office Action from foreign counterpart Korean Patent Application No. 20157031234, dated Apr. 20, 2016, 16 pages.
Partial Supplementary European Search Report from European Patent Application No. 14817656.3, dated Feb. 20, 2017, 7 pages.
Reporting Letter for Taiwan Patent Application No. 103121591, dated Jun. 30, 2016, 3 pages.
Reporting Letter for Taiwan Patent Application No. 103121591, dated Nov. 2, 2015, 4 pages.
Search Report of R.O.C. Patent Application No. 103121591, dated May 4, 2016, 1 page.
Search Report of R.O.C. Patent Application No. 103121591, dated Sep. 24, 2015, 1 page.
Non-Final Office Action from U.S. Appl. No. 15/785,030, dated Dec. 5, 2018, 38 pages.
Notice of Allowance from U.S. Appl. No. 15/487,080, dated Oct. 3, 2018, 15 pages.
Second Office Action from foreign counterpart Chinese Patent Application No. 201480030625.0, dated Nov. 14, 2018, 6 pages.
Notice of Granting Patent Right for Invention from foreign counterpart Chinese Patent Application No. 201480030625.0, dated Mar. 6, 2019, 4 pages.
Corrected Notice of Allowance from U.S. Appl. No. 15/487,080, dated Jan. 9, 2019, 11 pages.
Notice of Allowance from U.S. Appl. No. 15/785,030, dated Apr. 11, 2019, 17 pages.

* cited by examiner

US 10,387,148 B2

APPARATUS AND METHOD TO REVERSE AND PERMUTE BITS IN A MASK REGISTER

FIELD OF THE INVENTION

Embodiments of the invention relate generally to the field of computer systems. More particularly, the embodiments of the invention relate to an apparatus and method for reversing and permuting bits in a mask register.

BACKGROUND

General Background

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term instruction generally refers herein to macro-instructions—that is instructions that are provided to the processor for execution—as opposed to micro-instructions or micro-ops—that is the result of a processor's decoder decoding macro-instructions.

The instruction set architecture is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file as described in U.S. Pat. No. 5,446,912; the use of multiple maps and a pool of registers as described in U.S. Pat. No. 5,207,132), etc. Unless otherwise specified, the phrases register architecture, register file, and register are used herein to refer to that which is visible to the software/programmer and the manner in which instructions specify registers. Where a distinction is required, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. A given instruction is expressed using a given instruction format (and, if defined, in a given one of the instruction templates of that instruction format) and specifies the operation and the operands. An instruction stream is a specific sequence of instructions, where each instruction in the sequence is an occurrence of an instruction in an instruction format (and, if defined, a given one of the instruction templates of that instruction format).

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. This type of data is referred to as packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that has only one or has more than two source vector operands; that operate in a horizontal fashion; that generates a result vector operand that is of a different size, that has a different size data elements, and/or that has a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The SIMD technology, such as that employed by the Intel® Core™ processors having an instruction set including x86, MMXT™, Streaming SIMD Extensions (SSE), SSE2, SSE3, SSE4.1, and SSE4.2 instructions, has enabled a significant improvement in application performance (Core™ and MMX™ are registered trademarks or trademarks of Intel Corporation of Santa Clara, Calif.). An additional set of future SIMD extensions, referred to the Advanced Vector Extensions (AVX) and using the VEX coding scheme, has been published.

DETAILED DESCRIPTION

Exemplary Processor Architectures and Data Types

Figure 1:
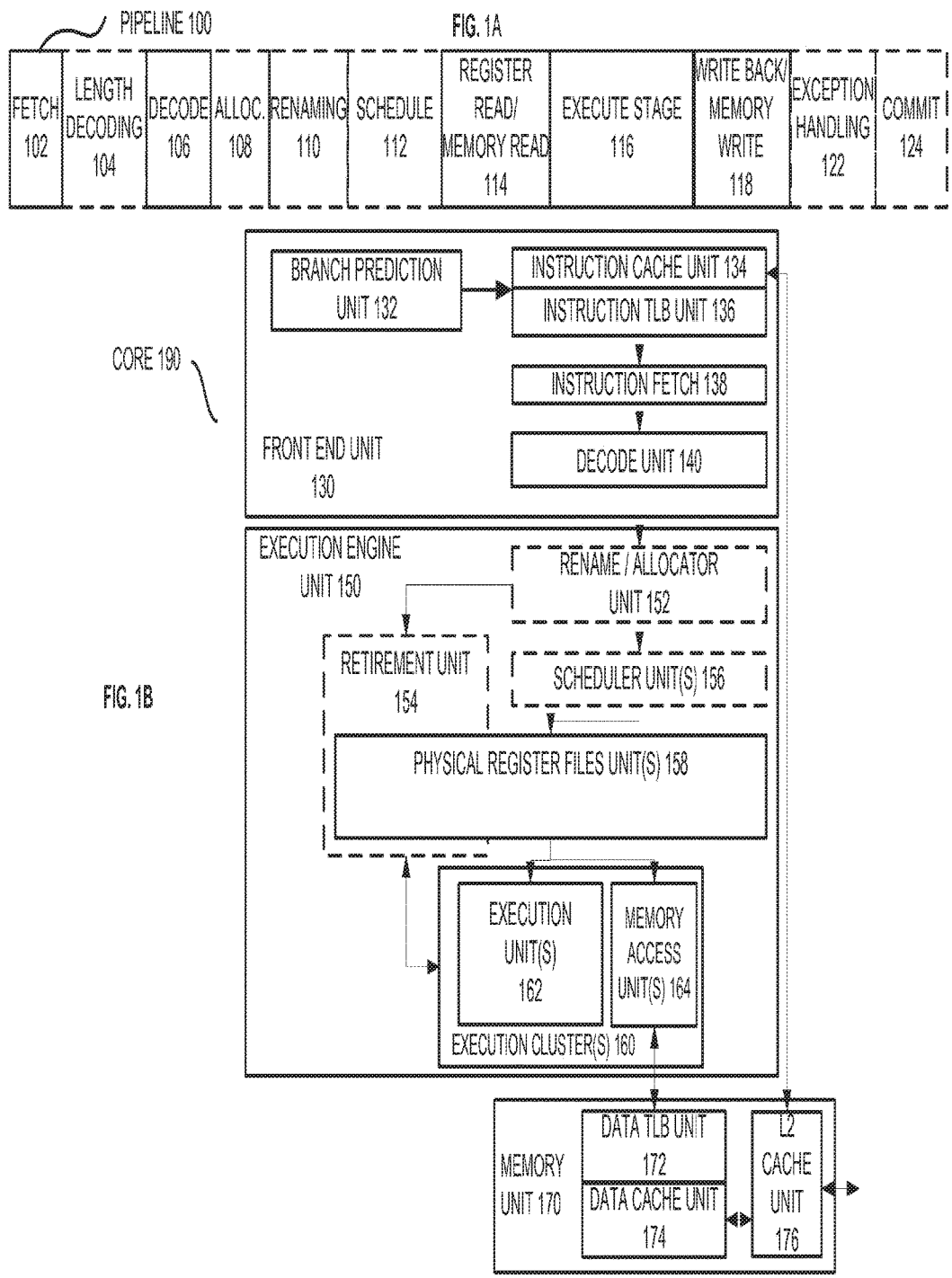
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
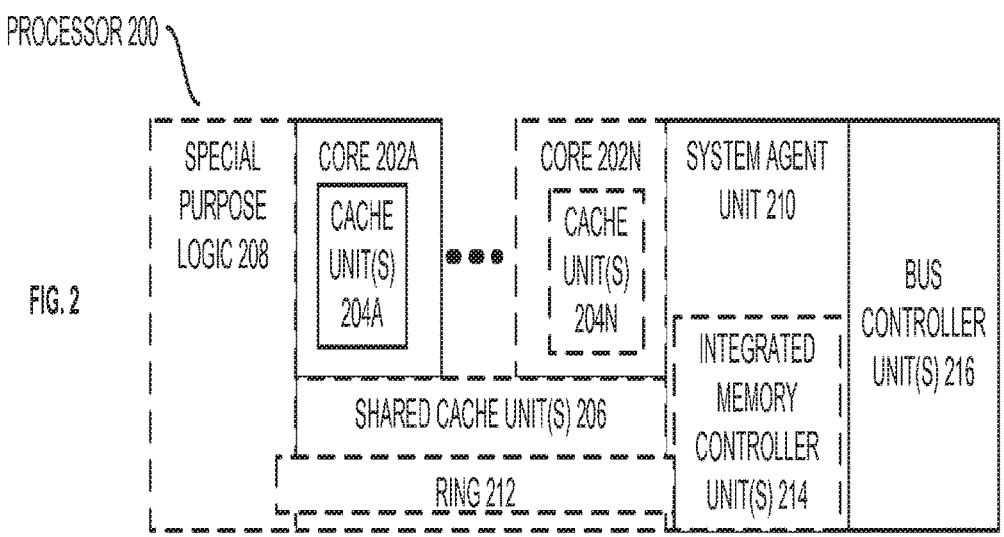
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
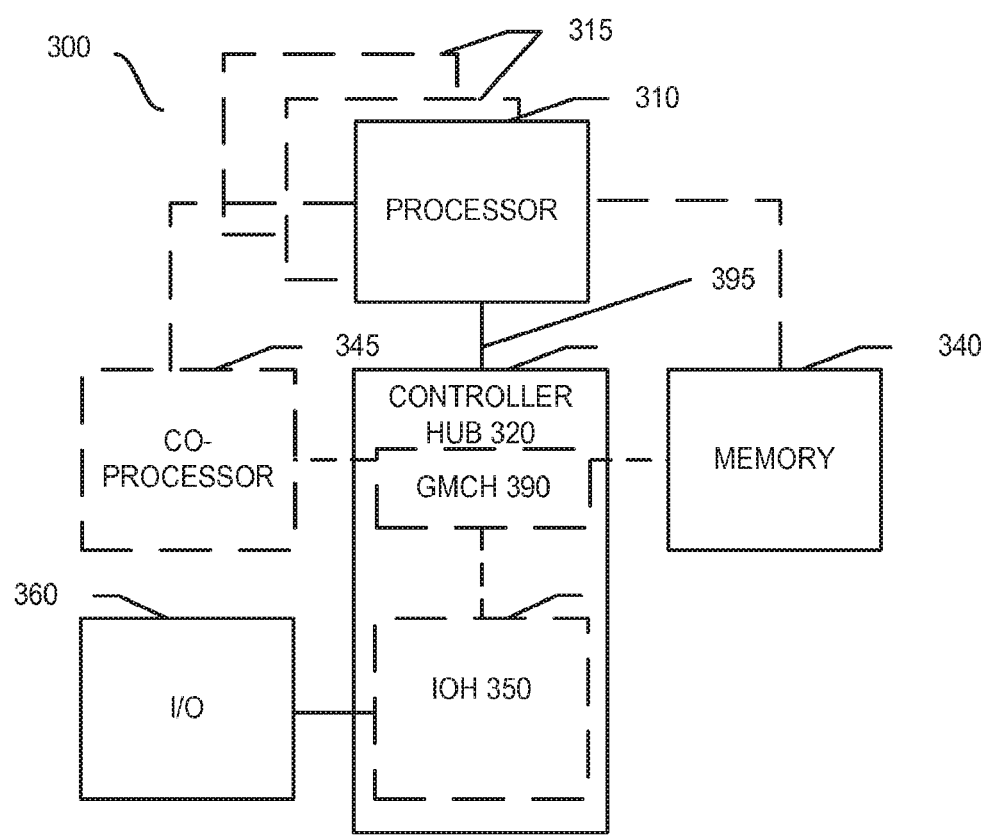
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment, the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
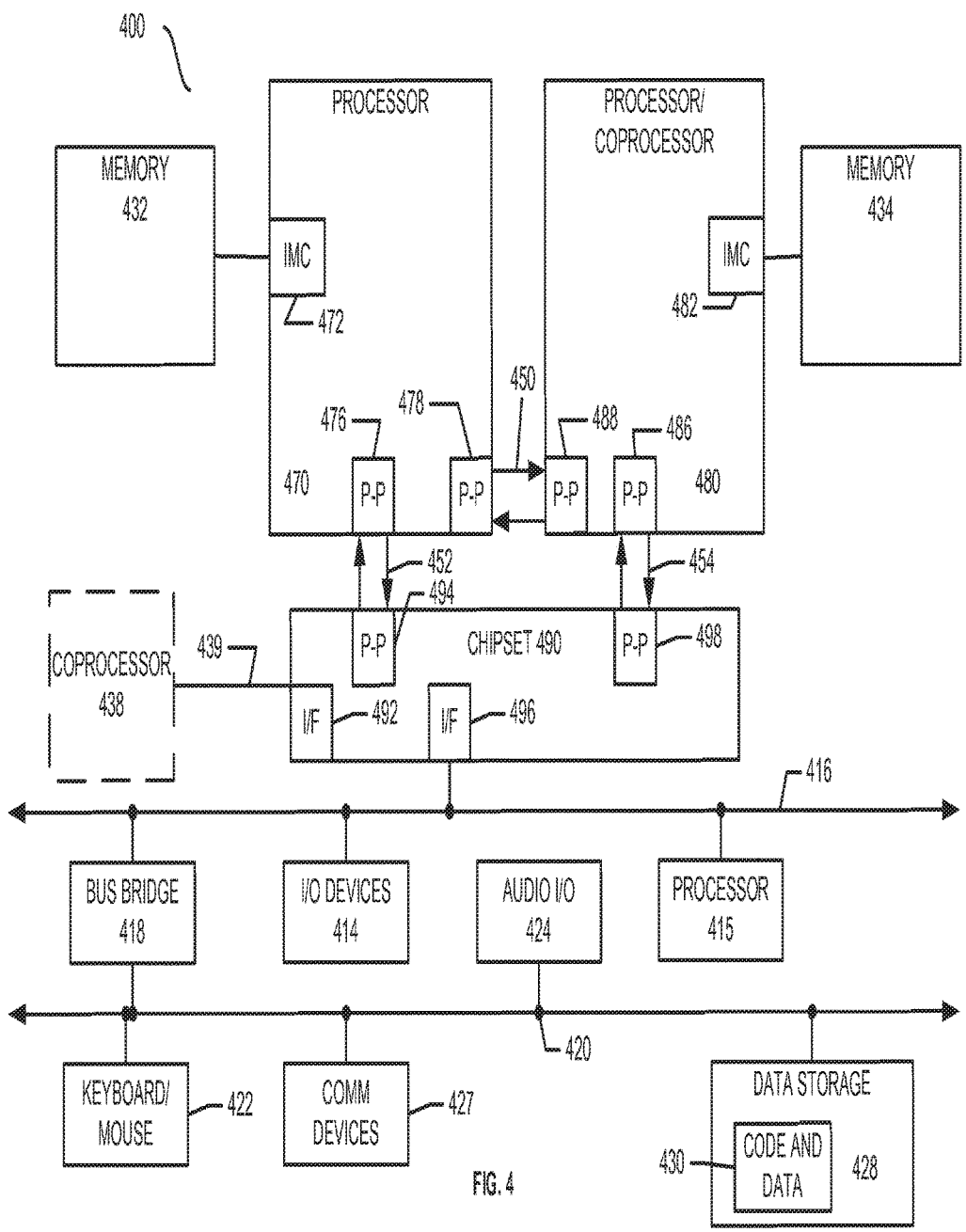
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416.

In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
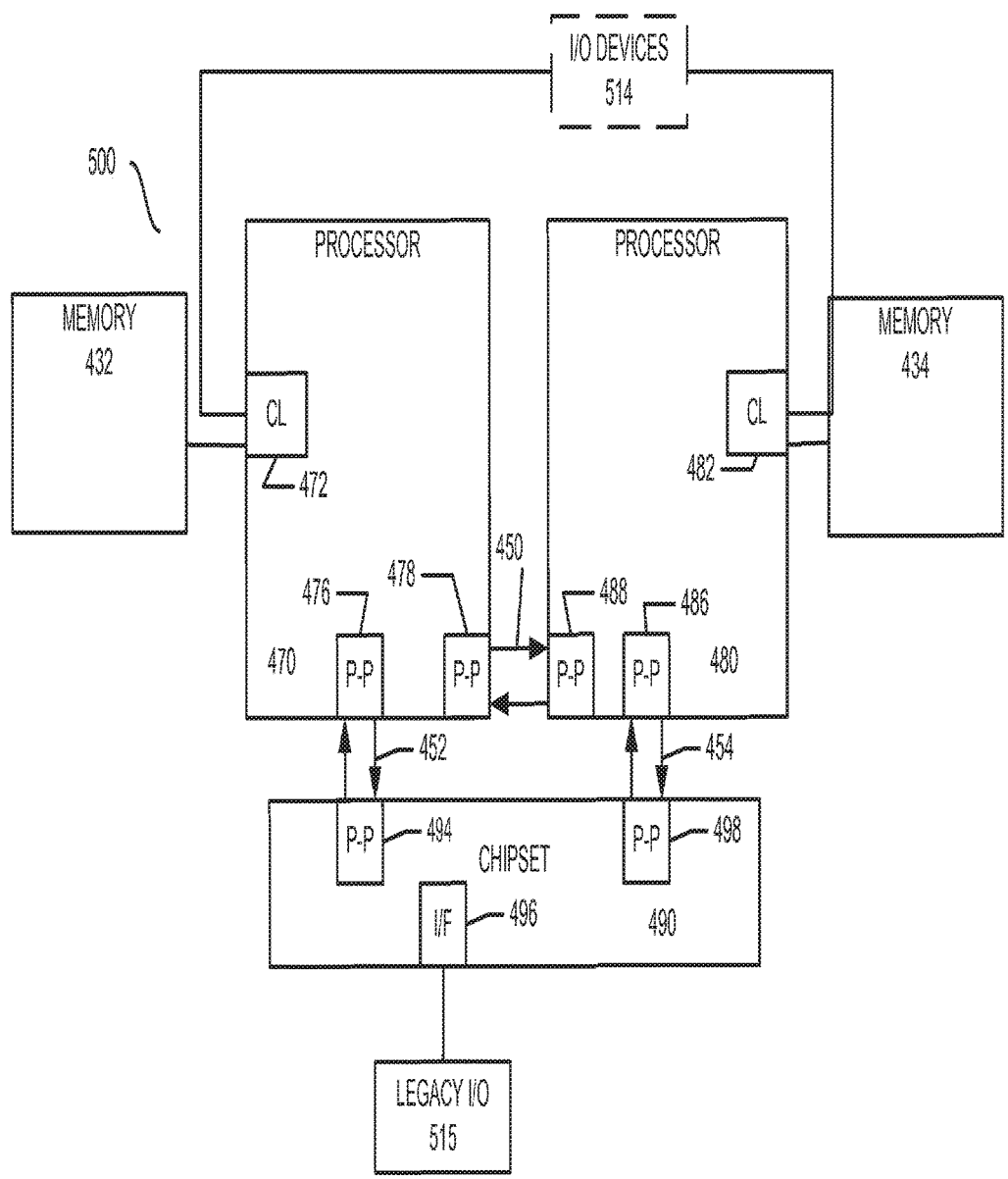
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
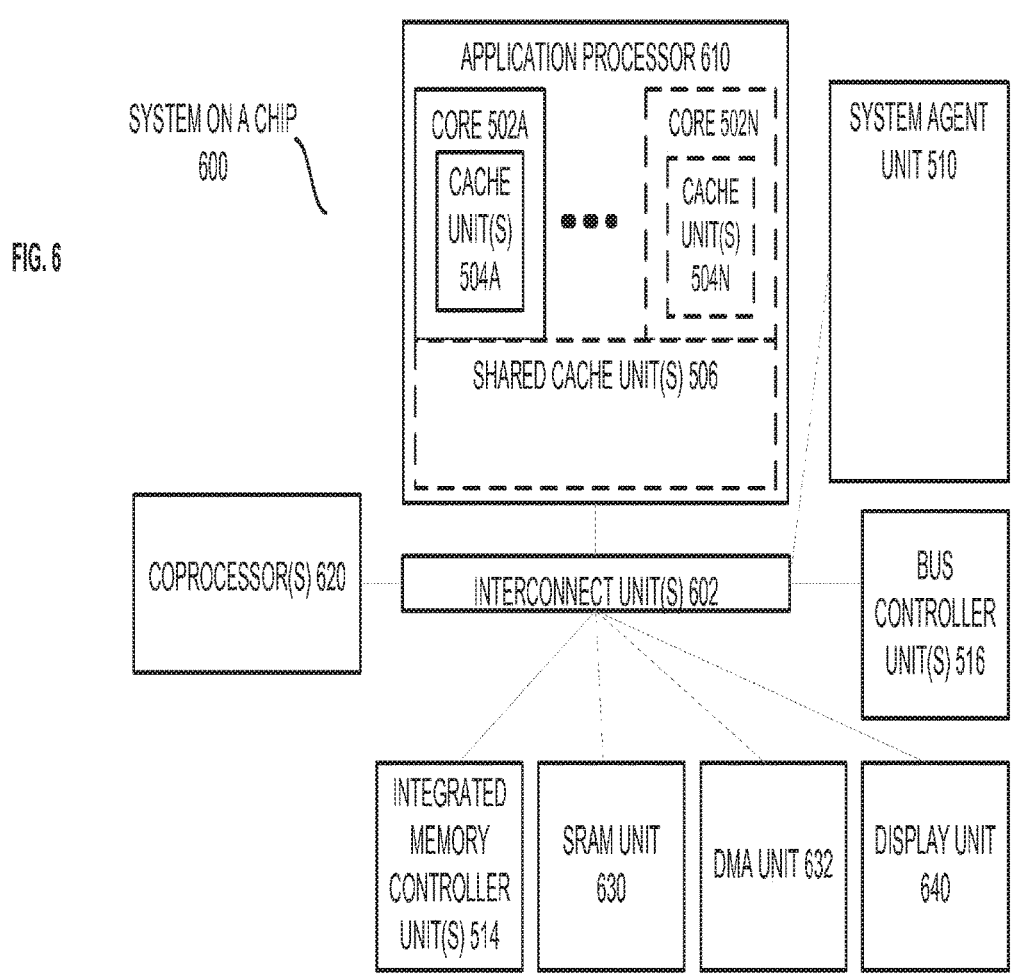
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
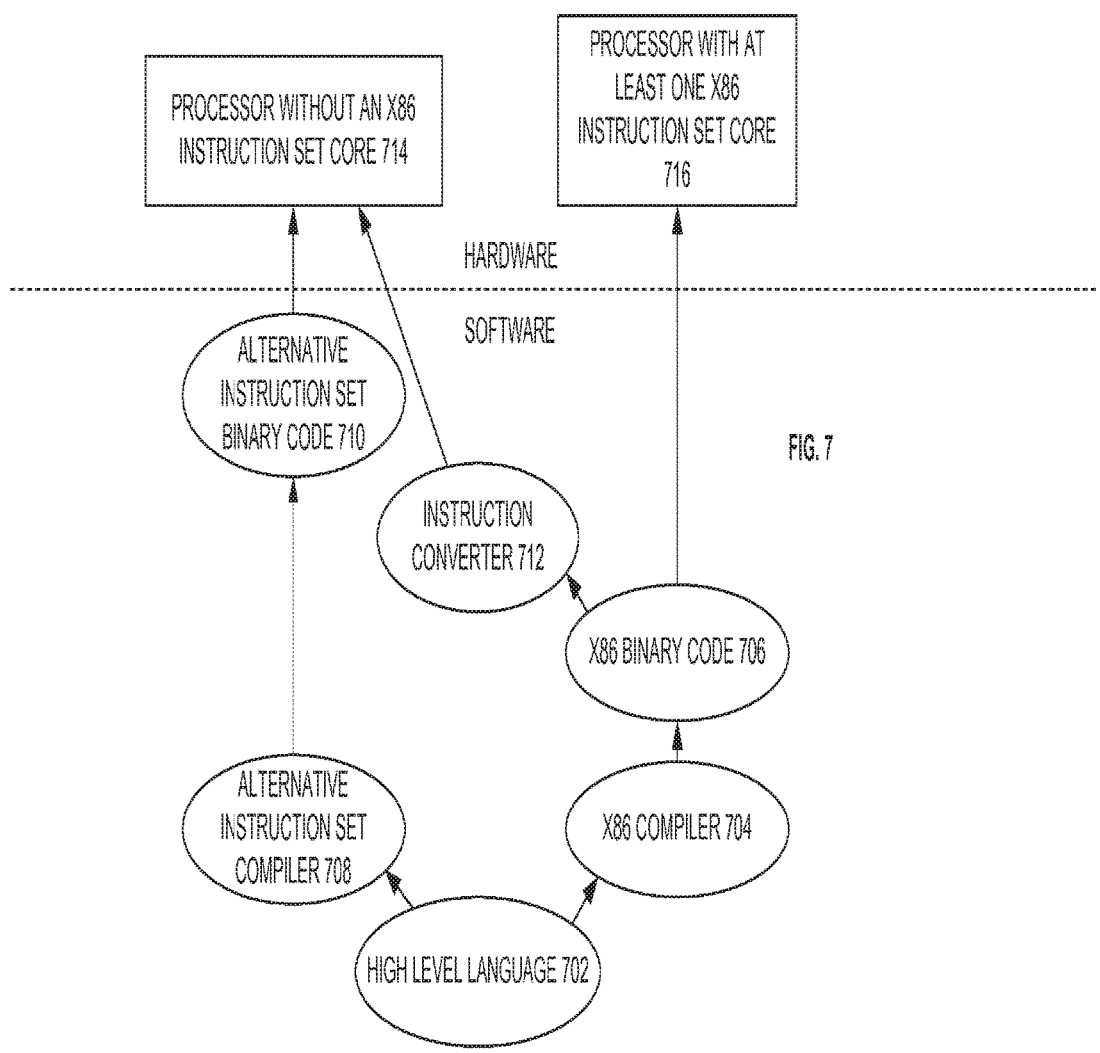
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Embodiments to Reverse and Permute Bits in a Mask Register

Mask registers as used herein effectively contain bits which correspond to elements in a vector register and track the elements upon which operations should be performed. For this reason it is needed to have common operations which can replicate similar behavior on these mask bits as for the vector registers and in general allow one to adjust these mask bits within the mask register.

One embodiment of the invention includes instructions that reverse the bits inside a mask register by replacing the bit at position n with the bit at the symmetric position depending on the mask size. Because each mask bit corresponds to a single vector element, the number of active bits in a mask register depends on both the size of the vector register (in bits) and the size of the elements. So different forms for different data types may be employed including, by way of example and not limitation, Byte (8-bit), Word (16-bit), Doubleword (32-bit), and Quadword (64-bit) sizes. One mask register may be used as a source and the results written to a second mask register.

Below is a pseudo code for a possible implementation of the proposed instruction for the doubleword form. Of course, this instruction can be implemented for other data types (byte, word and quadword).

```
KREVERSEBITSD kl, k2
FOR j ← 0 TO 31
    DEST[j] ← SRC2[31−j];
    j++;
ENDFOR
DEST[MAX_KL−1:32] ← 0
```

In the final line, DEST[MAX_KL−1:32]←0, means that bits are zeroed out if needed. For example, if the mask destination register is greater than 32 bits (e.g., 64 bits), then any bits over the first 32 are zeroed out.

Figure 8:
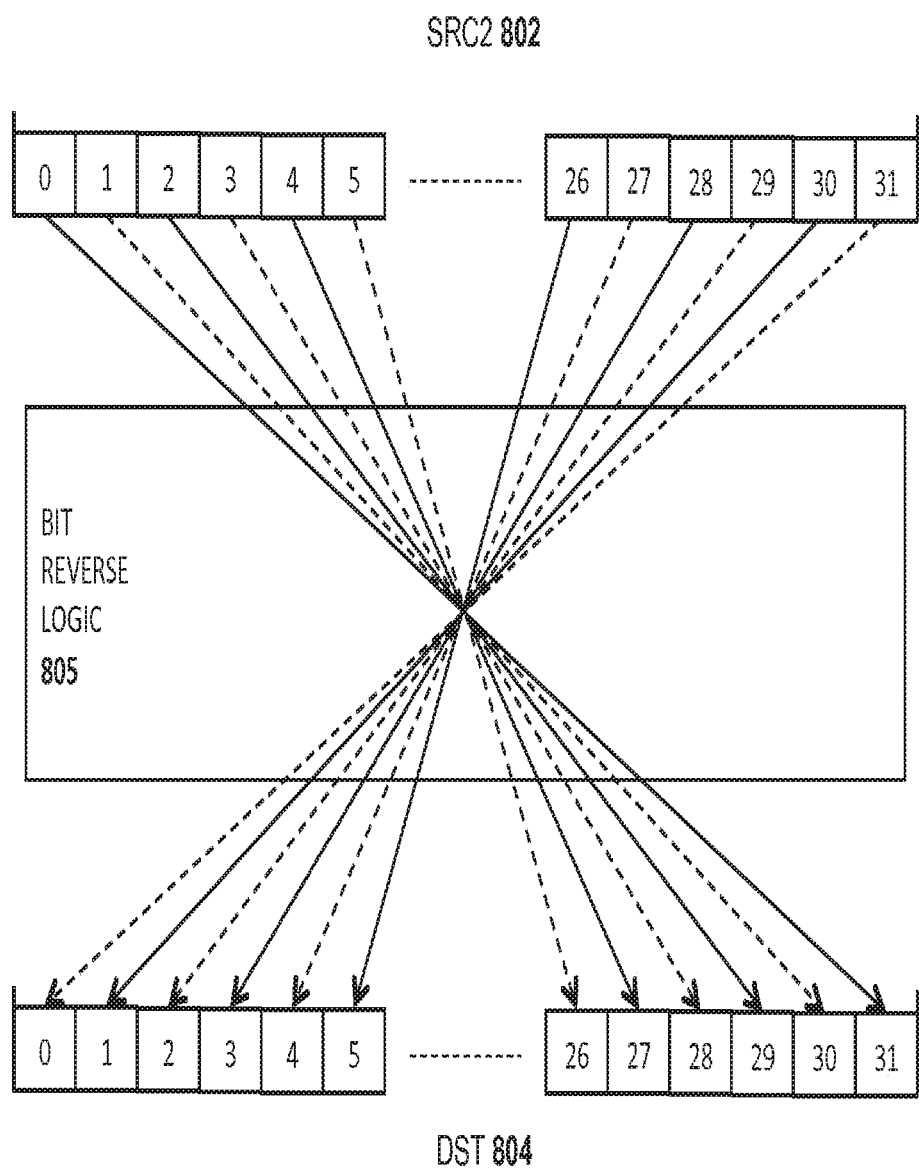
FIG. 8 illustrates an apparatus for performing a mask bit reversal operation according to one embodiment of the invention.

FIG. 8 illustrates architectural components employed in one embodiment including bit reverse logic 805 for executing the mask reverse bits instruction. In response, the bit values from the mask in SRC2 802 are transferred into symmetric positions within the destination 804 as illustrated. For example, the bit reverse logic 805 transfers the bit at position 0 in the source 802 to bit position 31 in the destination 804; the bit at position 1 in the source 802 to bit position 30 in the destination 804, etc, until all bits have been transferred from the source to the destination, resulting in a symmetric, "mirror image" of the original bit arrangement. The resulting mask stored in the destination 804 may then be used for subsequent vector operations.

Another embodiment of the invention includes instructions which permute values from a first mask operand (destination) and a third operand (second source) and inserts them in the destination operand at the locations pointed by the indices in a second operand (first source). Note that these instructions permit one bit value from the source to be copied to more than one location in the destination operand. Because each mask bit corresponds to a single vector element, the number of active bits in a mask register depends on both the size of the vector register (in bits) and the size of the elements. So this permute operation has forms for different data types Byte (8-bit), Word (16-bit), Doubleword (32-bit), and Quadword (64-bit) sizes.

One embodiment of the instruction takes two sources: a mask register to be permuted and a vector register that contains the permute control. The result is written to a second mask register.

Below is a pseudo code for a possible implementation of the proposed instruction for the doubleword form. Of course, this instruction can be implemented for other data types (byte, word and quadword).

```
KPERMD kl, zmm1, k2
FOR j ← 0 TO 31
    i ← j * 16
    id ← SRC1[i+5:i]
    DEST[j] ← SRC2[id];
    j++;
ENDFOR
DEST[MAX_KL−1:32] ← 0
```

In this embodiment, on each iteration, 6 bits in SCR1 are used as an index to identify a bit position in SRC2. This bit is then transferred to the destination mask register, DEST, at position j. Once again, in the final line, DEST[MAX_KL−1:32]←0, means that bits are zeroed out if needed. For example, if the mask destination register is greater than 32 bits (e.g., 64 bits), then any bits over the first 32 are zeroed out.

Figure 9:
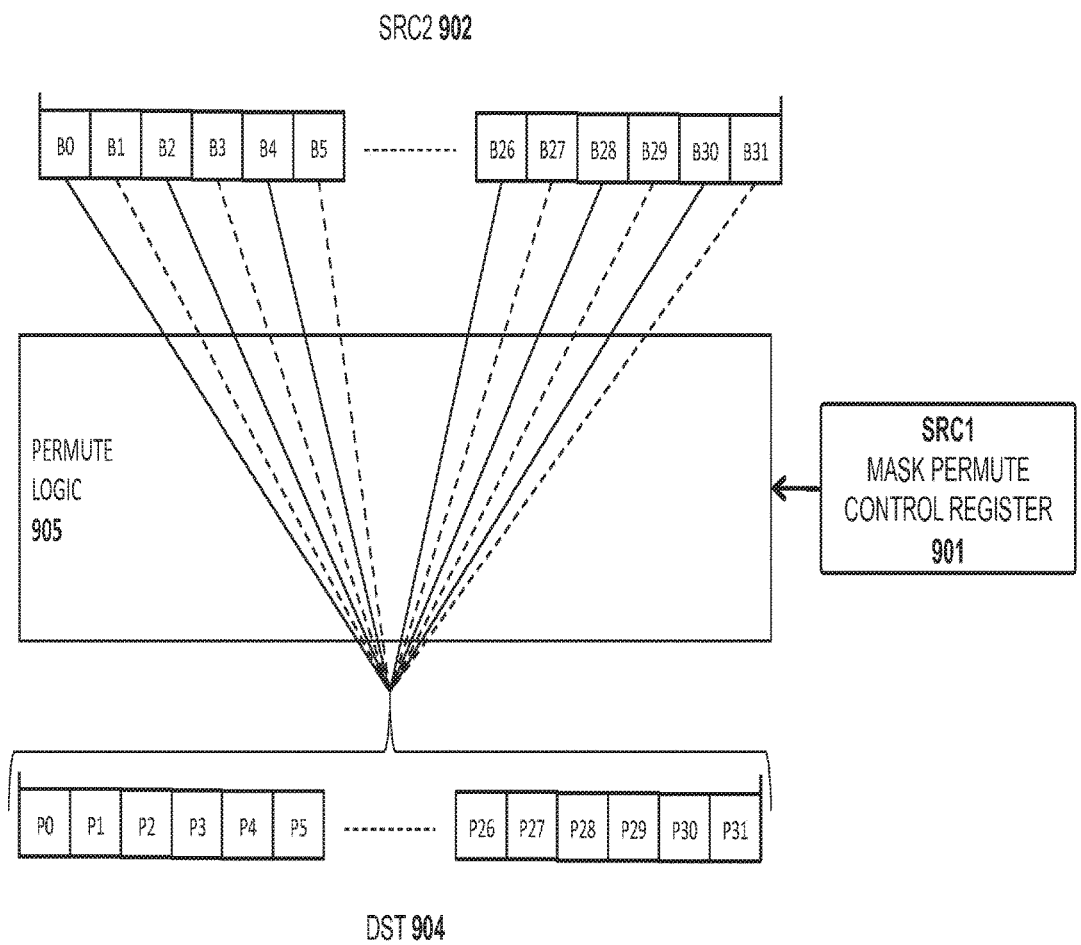
FIG. 9 illustrates an apparatus for performing a mask bit permute operation according to another embodiment of the invention.

FIG. 9 illustrates architectural components employed in one embodiment including permute logic 905 for executing the mask permute instruction. In response to the indices read from the mask permute control register 901 (SRC1 in the example), bits from specified bit positions B0-B31 in the SRC2 register 902 are permuted to different bit positions P0-P31 in the destination register DST 904 (identified by the variable j). Using different indices in the permute control register, any bit from SRC2 902 may be copied to any bit position in DST 904.

Figure 10:
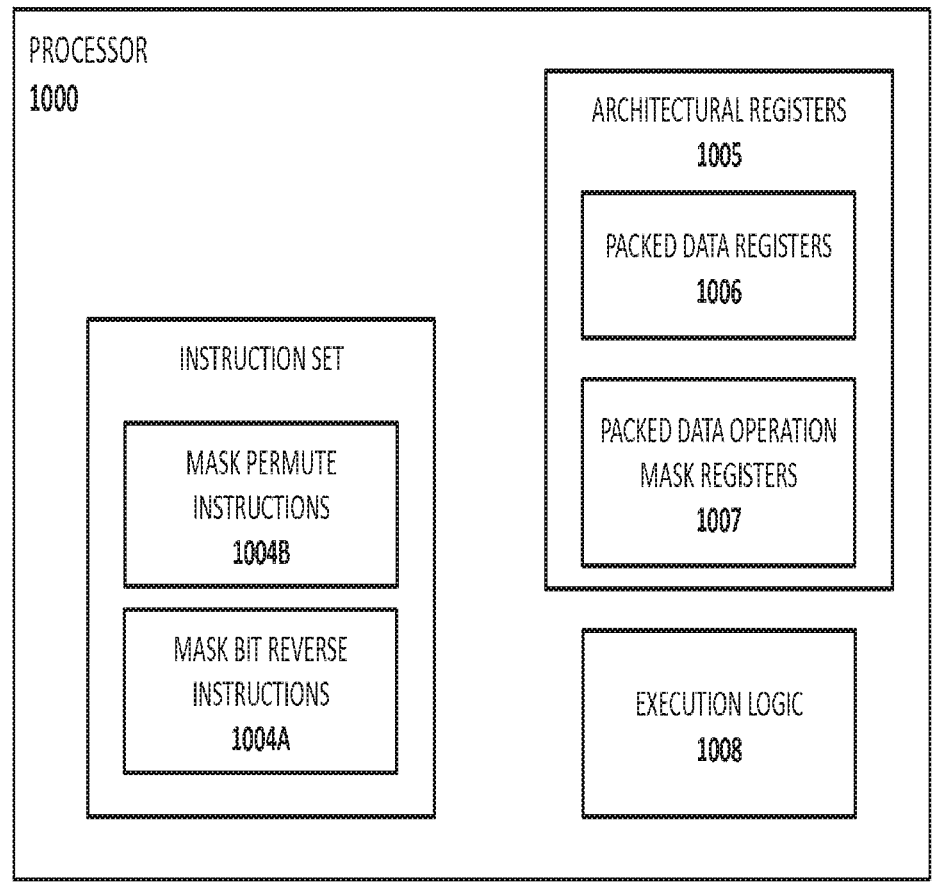
FIG. 10 illustrates a processor architecture including packet data register and packed data operation mask registers.

FIG. 10 is a block diagram of an exemplary embodiment of a processor (processor core) 1000 to execute one or more mask bit reverse instructions 1004A (e.g., KREVERSEBITSD) and/or mask permute instructions 1004B (e.g., KPEMD). In some embodiments, the processor may be a general-purpose processor (e.g., of the type used in desktop, laptop, servers, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers, to name just a few examples. The processor may be any of various complex instruction set computing (CISC) processors, various reduced instruction set computing (RISC) processors, various very long instruction word (VLIW) processors, various hybrids thereof, or other types of processors entirely.

The processor 1000 includes architecturally-visible registers (e.g., an architectural register file) 1005. The architectural registers may also be referred to herein simply as registers. Unless otherwise specified or apparent, the phrases architectural register, register file, and register are used herein to refer to registers that are visible to the software and/or programmer and/or the registers that are specified by macroinstructions or assembly language instructions to identify operands. These registers are contrasted to other non-architectural or non-architecturally visible registers in a given microarchitecture (e.g., temporary registers used by instructions, reorder buffers, retirement registers, etc.). The registers generally represent on-die processor storage locations.

The illustrated architectural registers may include packed data registers 1006 operable to store packed or vector data. The illustrated architectural registers may also include packed data operation mask registers 1007. Each of the packed data operation mask registers may be operable to store a packed data operation mask. These registers may be referred to as writemask registers in this description. Packed data operands may be stored in the packed data registers 1007.

The processor also includes execution logic 1008 operable to execute or process the one or more of the mask bit reverse instructions 1004A and/or mask permute instructions 1004B. In some embodiments, the execution logic may include particular logic (e.g., particular circuitry or hardware potentially combined with firmware) to execute these instructions.

Figure 11:
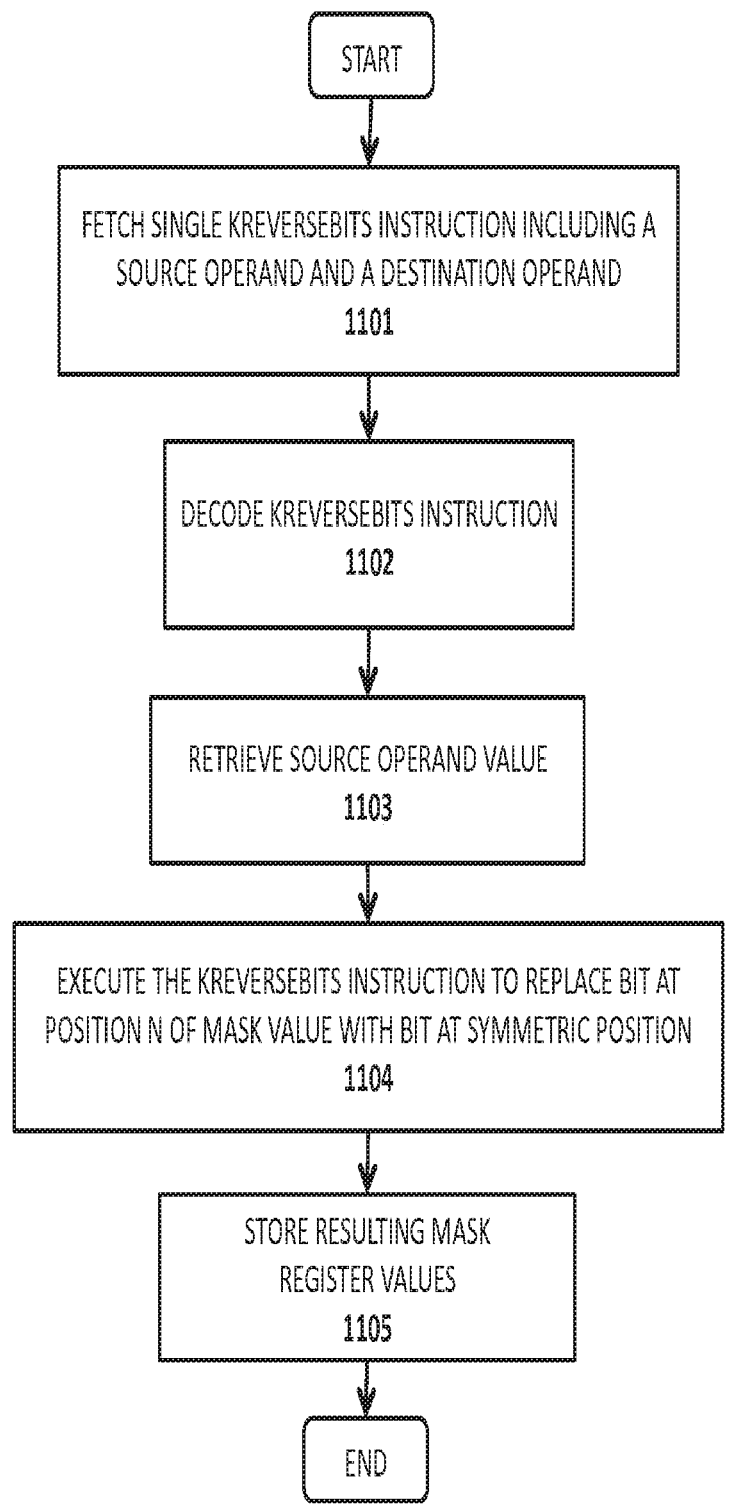
FIG. 11 illustrates a method for performing a mask bit reversal operation according to one embodiment of the invention.

FIG. 11 illustrates an embodiment of the execution of a KREVERSEBITS instruction in a processor. A KREVESEBITS instruction with a first source register operand and a destination register operand, and an opcode is fetched at 1101.

The KREVESEBITS instruction is decoded by decoding logic at 1102.

The source operand values are retrieved/read at 1103. For example, the source registers are read.

The decoded KREVESEBITS instruction (or operations comprising such an instruction such as microoperations) is executed by execution resources such as one or more functional units at 1104 to replace each bits at position n with a bit at a symmetric position in the source mask register. The newly determined mask values are stored into the destination register operand at 1105. In some embodiments, the calculated values are stored in data elements of a packed data register. While 1104 and 1105 have been illustrated separately, in some embodiments they are performed together as a part of the execution of the instruction.

Figure 12:
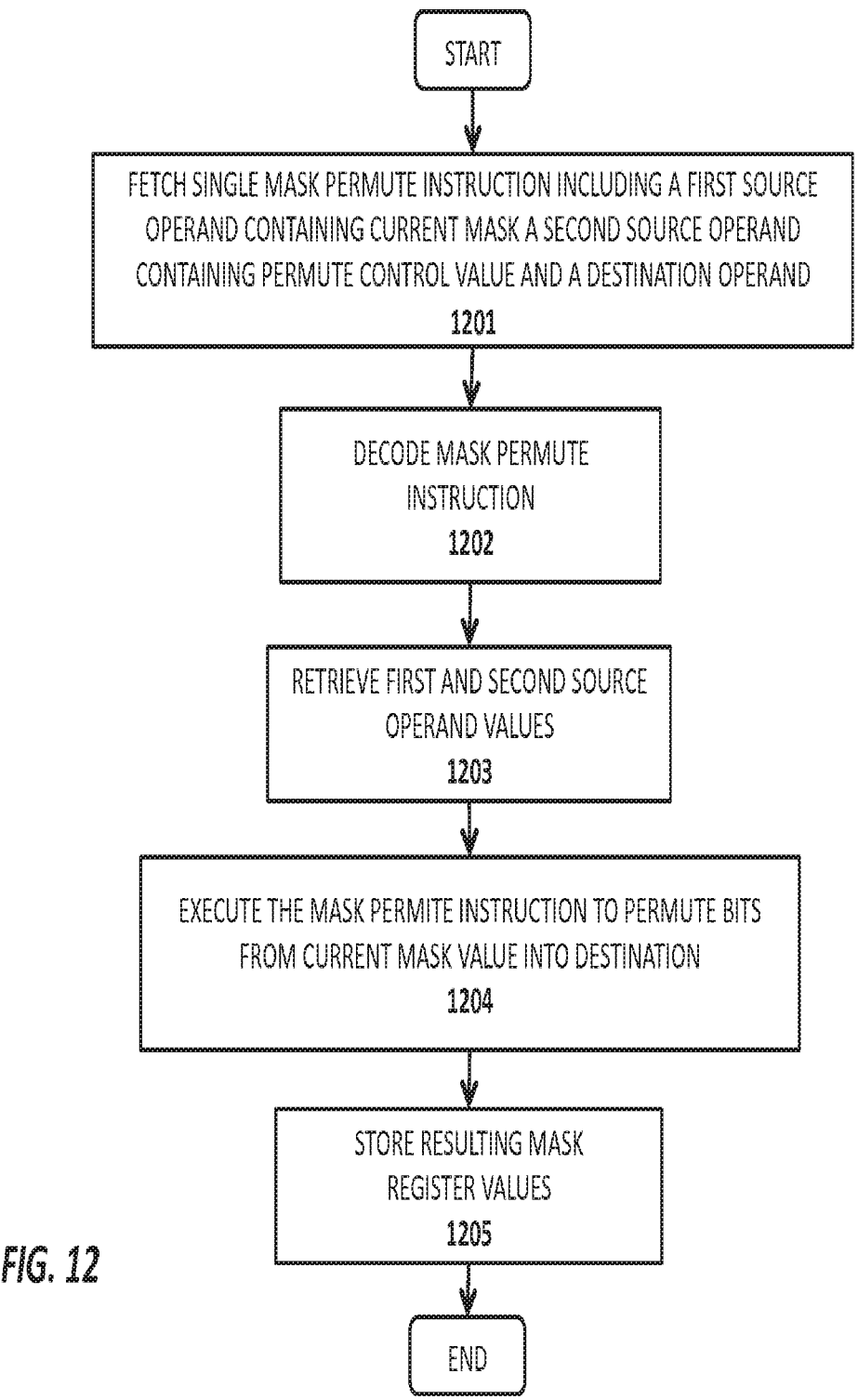
FIG. 12 illustrates a method for performing a mask bit permute operation according to another embodiment of the invention.

FIG. 12 illustrates an embodiment of the execution of a KPERM instruction in a processor. A KPERM instruction with a first source register operand and a destination register operand, and an opcode is fetched at 1201.

The KPERM instruction is decoded by decoding logic at 1202.

The source operand values are retrieved/read at 1203. For example, the control bits are read from one source register to determine how to permute the bits (e.g., SRC1 901 in FIG. 9) and the bits to be permuted are read from the other source register (e.g., SCR2 902).

The decoded KPERM instruction (or operations comprising such an instruction such as microoperations) is executed by execution resources such as one or more functional units at 1204 to permute bits from a source mask register (SRC2) into a destination mask register (DEST). The newly determined mask values are stored into the destination register operand at 1205. In some embodiments, the calculated values are stored in data elements of a packed data register. While 1204 and 1205 have been illustrated separately, in some embodiments they are performed together as a part of the execution of the instruction.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
a system memory; and
a processor coupled to the system memory the processor comprising:
a plurality of vector registers;
a plurality of general-purpose registers;
a plurality of architectural mask registers including a source mask register and a destination mask register, the source mask register to store a mask that is to include a plurality of mask bits in a first mask bit arrangement, the plurality of mask bits to be associated with a plurality of data elements of a vector register, and to indicate upon which of the associated data elements a vector operation is to be performed;
a decoder to decode a mask bit-reverse instruction that is to specify the source mask register and the destination mask register; and
an execution unit coupled to the decoder and the plurality of mask registers, the execution unit, in response to execution of the decoded instruction, to:
perform a mask bits reversal operation to symmetrically bit-reverse the first mask bit arrangement of the plurality of mask bits to cause the plurality of mask bits to have a second mask bit arrangement; and
store the plurality of mask bits in the second mask bit arrangement in the destination mask register.

2. The system of claim 1, wherein each of the plurality of mask bits corresponds to an 8-bit byte data element of the vector register.

3. The system of claim 1, wherein the destination mask register is to store additional bits in addition to the plurality of mask bits, and wherein the additional bits are all to have a value of zero.

4. The system of claim 1, wherein a number of the plurality of mask bits is to depend upon a size of the vector register and a size of the data elements.

5. The system of claim 1, wherein the plurality of mask bits is to comprise 64-bits.

6. The system of claim 1, wherein the second mask bit arrangement of the plurality of mask bits is to be a mirror image of the first mask bit arrangement of the plurality of mask bits.

7. The system of claim 1, wherein the decoder and the execution unit are included in an out-of-order core, and wherein the out-of-order core comprises a reorder buffer (ROB).

8. The system of claim 1, wherein the processor further comprises:
a level 1 (L1) cache; and
a level 2 (L2) cache.

9. The system of claim 1, wherein the processor is a reduced instruction set computing (RISC) processor.

10. The system of claim 1, further comprising a mass storage device coupled to the processor.

11. The system of claim 1, further comprising a disk drive coupled to the processor.

12. The system of claim 1, further comprising an Input/Output (I/O) device coupled to the processor.

13. The system of claim 1, further comprising a communication device coupled to the processor.

14. The system of claim 1, further comprising a second processor coupled to the processor.

15. The system of claim 1, further comprising a Peripheral Component Interconnect (PCI) Express bus coupled to the processor.

16. The system of claim 1, further comprising audio I/O coupled to the processor.

17. The system of claim 1, wherein the system memory comprises a dynamic random access memory (DRAM).

18. The system of claim 1, wherein the system memory comprises instructions that when performed by the system are to cause the system to use the instruction to perform the mask bits reversal operation to replicate a similar operation that is to be performed on the plurality of data elements of the vector register.

* * * * *